(12) United States Patent
Dragt et al.

(10) Patent No.: US 7,906,165 B1
(45) Date of Patent: Mar. 15, 2011

(54) METHOD FOR MAKING JUICE

(75) Inventors: Steven Richard Dragt, Bakersfield, CA (US); Santuscha Tjin Akwie Souza, Belem (BR)

(73) Assignee: Wm. Bolthouse Farms, Inc., Bakersfield, CA (US)

( * ) Notice: Subject to any disclaimer, the term of this patent is extended or adjusted under 35 U.S.C. 154(b) by 971 days.

(21) Appl. No.: 11/736,336

(22) Filed: Apr. 17, 2007

(51) Int. Cl.
*A23F 5/00* (2006.01)
*A23F 5/22* (2006.01)
*A23L 1/00* (2006.01)
*A23L 1/10* (2006.01)
*A23L 1/28* (2006.01)

(52) U.S. Cl. ........ 426/433; 426/424; 426/479; 426/482; 426/489

(58) Field of Classification Search .............. 426/424, 426/433, 479, 482, 489
See application file for complete search history.

(56) References Cited

U.S. PATENT DOCUMENTS 5,433,965 A * 7/1995 Fischer et al. ............... 426/548

FOREIGN PATENT DOCUMENTS

| FR | 2670364 | * | 12/1990 |
| JP | 63036742 | * | 2/1988 |

OTHER PUBLICATIONS

Machine Translation of FR2670364, Apr. 2010.*
Derwent abstract JP 63036742 (1988).*
Alexander G. Schauss,Phytochemical and Nutrient Composition of the Freeze-Dried Amazonian Palm Berry, *Euterpe oleraceae* Mart. (Acai),J. Agric. Food Chem., 2006, 54 (22), pp. 8598-8603.*
Ashurst et al., Production and Packaging of Non-Carbonated Fruit Juices, 1995, p. 286, 10.4.2.*

* cited by examiner

*Primary Examiner* — Callie E Shosho
*Assistant Examiner* — Lela S Williams
(74) *Attorney, Agent, or Firm* — James M. Duncan, Esq.; Klein, DeNatale, Goldner, Cooper et al.

(57) ABSTRACT

A method for making juice from açaí berries having the steps of: chilling the berries to below about 10° C.; extracting a skin from the berries in an extractor with water to obtain a mixture; acidifying the mixture; finishing the mixture; heating the mixture to from about 40° C. to about 60° C.; de-aerating the mixture; passing the mixture through at least one of the group consisting of a high shear mixer, a colloid mill and a hammer mill to yield juice; and pasteurizing the juice.

12 Claims, 1 Drawing Sheet

METHOD FOR MAKING JUICE

BACKGROUND

The present invention is directed to methods for making berry juice and more particularly, to methods of making juice from açaí berries.

Açaí berries are harvested from a palm tree (Euterpe oleracea Mart) that grows naturally near the Amazon river and its tributaries. The fruit of açaí berries is composed of a nut comprising about 80% of the berry volume, a layer of sclerid cells on the outer periphery of the nut, a matrix layer of lipids, fibers and other compounds outside the nut and a highly pigmented skin that is rich in anthocyanins. The berries are approximately 12 mm in diameter.

The berries degrade quickly once they are picked due to dehydration, bruising damage, microbiological activity, enzymatic activity and bio-chemical activities related to the high ambient temperatures of their environment which range from about 85° F. to about 102° F.). Degradation reduces the anthocyanin content in the skin of the berries.

The berries are traditionally hot soaked in nearby homes followed by a manual extraction of the outer two layers from the nut over a woven screen. This makes a thick pulp which is consumed locally within one day. Additionally, commercial açaí pulp is prepared using the two processes described below.

In a traditional batch process, Açaí is picked in the jungle and put into baskets called rasas. Rasas are carried at ambient temperature to a canoe or boat. The rasas are loaded into a larger boat and transported to an açaí market or directly to a processing plant. Total transport time at ambient temperature is between 2 and 48 hours.

At the processing plant, the açaí berries are soaked in water, normally at ambient temperature. The water may contain sodium hypochloride at a concentration of 100 ppm for up to 30 minutes. The berries are then soaked in hot water between 30 and 45 degrees Celsius for up to 4 hours. These warm berries are removed from the soak tank and processed in a rotating machine with water that rubs off the skin layer, the lipid layer and grains of lignin that are found between the lipid layer and the nut. This process makes a thick pulp that oxidizes rapidly, ferments quickly and contains a mixture of fat and water soluble fractions. The resulting pulp is measured to have a soluble solids level of less than 4 degrees brix. The pulp is sold fresh or pasteurized and/or frozen.

In a continuous process used today, açaí berries are picked in the jungle and put into rasas. The rasas are carried at ambient temperature to a canoe or boat. The rasas are then loaded into a larger boat and transported to an açaí market or directly to a processing plant. Total transport time at ambient temperature is between 2 and 48 hours.

At the processing plant, the açaí berries are soaked in hot water, normally at 40 to 60 degrees Celsius for 3 to 15 minutes. These warm berries are removed from the soak tank and processed in a rotating machine with water that rubs off the skin layer, the lipid layer and grains of lignin that are found between the lipid layer and the nut. This process also makes a thick pulp that oxidizes rapidly, ferments quickly and separates into fat and water soluble fractions quickly. The pH of this product is approximately 5.8 unless citric acid is added in the process to reduce the pH. The pulp is measured to have a soluble solids level of 3 to 4 degrees brix. The pulp is sold fresh or pasteurized and/or frozen.

There are numerous problems with pulp extracted by the existing processes. The pulp product contains "açaí sand" which is made of sclerid cells of lignin comprising up to 25% of the pulp by volume. These cells are extremely hard and abrasive. The abrasive nature of the cells damages processing equipment and prevents further processing through some homogenizers. The organoleptic impact of these cells has caused unpleasant mouth feel in many beverages blended with pulp containing açaí sand.

Additionally, the pulp product contains up to 50% lipids on a dry-weight basis. These lipids are mainly Omega-6 and Omega-9 fatty acids that are unstable. Rancidity in finished products is normal within 30 days of thawing and rancidity can occur within frozen drums of pulp. Despite extensive processing research, those skilled in the art have been unable remove the açaí sand or the lipids contained in the pulp product once the product has been processed without a significant negative impact on the flavor of the juice.

Additionally, the anthocyanin concentration found in the pulp is diluted by the presence of the water, lipids and the açaí sand. Moreover, the frozen pulp is difficult to thaw prior to use without lipid separation, rancidification or fermentation. Finally, it is very difficult to concentrate the pulp prior to packaging and shipping.

Therefore, a need exists for an improved juice from açaí berries and an improved method of making juice from açaí berries.

SUMMARY

Accordingly, the present invention is directed to a method for making juice from açaí berries that remedies the defects of the prior art. In an embodiment, the method comprises the steps of: chilling the berries to below about 10° C.; extracting a skin from the berries in an extractor with water to obtain a mixture; acidifying the mixture; finishing the mixture; heating the mixture to from about 40° C. to about 60° C.; de-aerating the mixture; passing the mixture through at least one of the group consisting of a high shear mixer, a colloid mill and a hammer mill to yield juice; and pasteurizing the juice.

Prior to chilling, and within about 6 hours of the time the berries are picked, the berries can be loaded into an insulated tanker of water having a temperature of from about 1 to about 5° C. for up to about 48 hours. The water in the tanker can have chlorine dioxide at a concentration of from about 1 to about 35 ppm.

The berries may be chilled by immersing the berries in water having a temperature of from about 1 to about 10° C. for from about 3 to about 10 minutes. Additionally, the mixture can be acidified using lime juice. The finished juice may be packaged. The finished juice may be frozen prior to packaging or following packaging.

The present invention is also directed to a juice made according to the method described herein. The present invention is also directed to a juice made from açaí berries comprising a soluble solids content exceeding three degrees brix. The juice may comprise a lipid content less than about 1% on a dry weight basis. Additionally, the juice may comprise a pH of less than about 5.0, and more preferably, less than about 4.4. Additionally, the juice may be substantially free of açaí sand.

BRIEF DESCRIPTION OF THE DRAWING

A better understanding of the present invention will be had with reference to the accompanying drawing in which.

DETAILED DESCRIPTION

Figure 1:
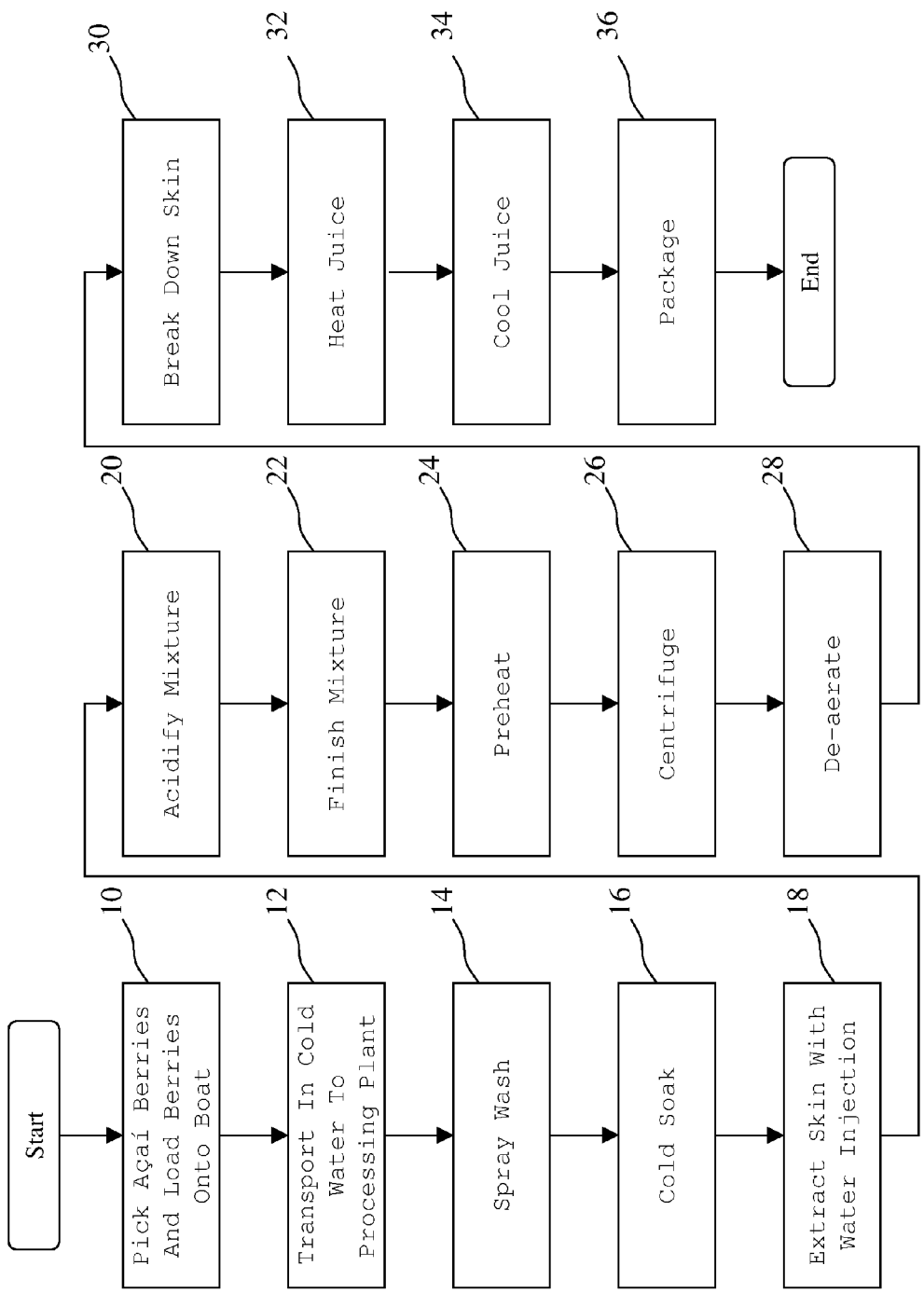
FIG. 1 is a schematic diagram of a process for making juice from açaí berries according to an embodiment of the present invention.

In the method of the present invention, açaí berries are picked and put into baskets that are carried at ambient temperature to a canoe or boat, step 10. At the boat, within about 6 hours of the time the berries were picked, the berries are loaded into an insulated tanker of cold water and moved to a processing plant, step 12. Water temperature in the insulated tanker ranges from about 1 to about 5° C. Preferably, the tankers are transported to the processing plant within about 48 hours of the time that the berries are placed in the water.

Optionally, the water may be treated with chlorine dioxide at a concentration of from about 1 to about 35 ppm, enough citric acid to reduce the water pH below about 4.4, and/or a calcium salt, such as calcium chloride, at a concentration of up to about 1%.

At the plant, the cold berries are removed from the tanker, rinsed and cleaned using a spray wash, step 14. The cleaned berries are then chilled to a temperature below about 10° C. by immersing the berries in water having a temperature of from about 1° C. to about 8° C. for from about 3 to about 10 minutes, step 16.

Once chilled, the berries are subjected to an extraction process in an extractor with small amounts of water that rubs off the skin layer only, thereby resulting in production of a mixture, step 18. The extractor has a drum with a central shaft passing through it. The shaft carries several bars oriented at right angles to the shaft. As the shaft rotates, the bars agitate the berries inside the drum so that the berries rub against each other, the bars and the walls of the drum. This rubbing action roughens the skin of the fruit in preparation for skin removal. The quantity of water used in the extraction process of the present invention is significantly less than the amount required in the traditional extraction processes.

Following the extraction process, the mixture is acidified to a pH that is less 5.0, and preferably less than 4.4, step 20. Numerous known acidulants may be used. Preferably, the acidulant is lime juice. Optionally, the acidified mixture is centrifuged or screened to remove any açaí sand produced by inefficiencies in the extraction equipment.

The mixture is then subjected to finishing, step 22. To accomplish finishing, the berries are placed in a first finisher. The first finisher has a screen with apertures ranging in size from about 3 to about 5 mm in diameter. The first finisher also contains a plurality of bars and brushes to move the berries against the screen. The skin is extracted from the berry when the bars and brushes in the first finisher force the berries to be moved against the screen. The action of sliding the berries over the apertures in the screen removes the skin from the central portion of the berry. Contaminants larger than the aperture size of the screen are moved out of the first finisher and discarded Once the skin is extracted from the fruit, the skin is separated from fiber and sand present from the extraction process in a second finisher. The second finisher has a second screen and a plurality of bars and brushes to slide the skin over the second screen. The second screen has a plurality of apertures having a diameter of from about 0.25 to about 1 mm. The skin fragments are broken down so that they pass through the second screen to separate out the fiber and sand. As the skin is slid against the apertures in the second screen, the skin is further broken down into small pieces, that are either dissolved into the juice present or passed through the second screen. Contaminants larger than the aperture size of the second screen are moved out of the second finisher and discarded. As will be recognized by one skilled in the art, the first and second finishers can be a single device.

After finishing, the mixture is warmed to a temperature of from about 40° C. to about 60° C., step 24. The mixture is then optionally centrifuged to remove trace amounts of lipids that are caused by inefficiencies in the extraction equipment, step 26.

The mixture is then de-aerated to reduce the dissolved oxygen level in the product and remove any free lipids from the liquid stream, step 28. De-aeration may be done by pumping the mixture into a vacuum chamber. The mixture is cascaded through an open space within the vacuum chamber in a manner that reduces the liquid particle size so that most oxygen entrained in the mixture can be removed by the vacuum. The mixture falls to the bottom of the chamber and is pumped out of the vacuum chamber. Vapors extracted from the mixture are condensed outside the vacuum chamber so that any volatile lipids may be eliminated.

The mixture is passed through a high shear mixer, colloid mill, homogenizer, hammer mill or disk grinder to break down the particles of skin and emulsify any remaining lipids, thereby resulting in production of juice, step 30. Preferably, the mixture is passed through a colloid mill. The colloid mill uses high shear to break down skin fragments into fruit juice. The mixture containing small skin fragments enters the colloid mill and is subjected to shear for a controlled amount of time based on the flow rate, motor speed and the space between a rotor and a stator of the mill. The shear induced in the mill breaks down particles to transform the particles into soluble solids incorporated in the liquid.

The juice is then subjected to pasteurization using a high temperature for a short period of time, step 32. Preferably, the juice is heated to from about 88 to about 95 degrees Celsius for from about 85 to about 120 seconds.

The pasteurized juice is then chilled, step 34. The chilled juice is then packaged, step 36. Optionally, the juice is filtered, such as through an 80 mesh screen prior to packaging. Optionally, the juice is frozen either prior to or following packaging.

Juice prepared according to the method of the present invention contains a higher concentration of anthocyanins than the pulp because the anthocyanins are only found in the skin layer of the fruit. Juice produced according to embodiments of the present invention has an anthocyanin concentration as measured as Oxygen Radical Absorption Capacity (ORAC) ranging from about 100,000 to about 300,000 micromoles of Trolox equivalents/liter). Preferentially, extracting the skin layer avoids dilution issues by the lipid/fiber layer and açaí sand. Also, extracting only the skin layer requires less water input which in turn leads to less dilution of the final product.

Juice produced according to the present invention has a lower extracted pH than pulp and is easily acidified to become a high acid material. Extracted juice can have a pH of about 5.0. After the addition of an acidulant, the juice preferably has a pH of less than about 4.4. The higher acidity of the acidified juice has minimal impact on the organoleptic evaluation of the product. The juice contains very low concentrations of fats, with a lipid content that is preferably less than about 1% on a dry weight basis. Moreover, the lipids are easily separated from the juice or stabilized by emulsifying the lipids into the juice. Preferably, açaí juice according to an embodiment of the present invention has a soluble solids content exceeding about three degrees brix, and more preferably exceeding about five degrees brix.

The inventive juice contains extremely low amounts of açaí sand, which is often undetectable in the final product. Due to the low viscosity of the juice, preferably between about 5 and about 20 centipoise, any remaining sand particles can be easily separated from the juice.

Additionally, the low viscosity of the juice product makes it an excellent candidate for concentration. Concentration stabilizes the anthocyanins and reduces shipping and storage costs of the finished product while making it easier to thaw in preparation for blending. Known methods such as membrane concentration and conventional evaporation can be used to concentrate the finished juice. Additionally, the juice is microbiologically stable and thaws easily from a frozen state, providing ample time for handling and blending without fermentation, rancidification or lipid separation problems.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstracts and drawings, and all the steps in any method or process disclosed, may be combined in any combination except combination where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" or "step" clause as specified in 35 U.S.C. §112.

What is claimed is:

1. A method for making juice from the skin of acaí berries comprising the steps of:
   a. chilling the berries to below about 10° C.;
   b. preparing the berries for skin removal by rubbing and roughening the skin of the berries in an extractor with the addition of water resulting in a first mixture;
   c. acidifying the first mixture;
   d. removing the skin from the berries in the first mixture in a finishing step to obtain a second mixture comprising skins, skin fragments, juice and water with the central portion of the berry, fiber and sand removed from the second mixture;
   e. heating the second mixture to from about 40° C. to about 60° C.;
   f. de-aerating the second mixture;
   g. passing the second mixture through at least one of the group consisting of a high shear mixer, a colloid mill and a hammer mill to yield juice; and
   h. pasteurizing the juice.

2. The method of claim 1 further comprising the following steps prior to step a:
   loading the berries into an insulated tanker of water within about six hours of the time the berries are picked, the water in the insulated tanker having a temperature of from about 1 to about 5° C.; and
   holding the berries in the insulated tanker for up to 48 hours.

3. The method of claim 2 wherein the water in the tanker further comprises chlorine dioxide at a concentration of from about 1 to about 35 ppm.

4. The method of claim 1 further comprising centrifuging the mixture prior to step f.

5. The method of claim 1 further comprising passing the juice through a homogenizer prior to step h.

6. The method of claim 1 wherein the berries are chilled by immersing the berries in water having a temperature of from about 1° C. to about 10° C. for from about 3 to about 10 minutes.

7. The method of claim 1 wherein the mixture is acidified using lime juice.

8. The method of claim 1 further comprising packaging the juice.

9. The method of claim 1 further comprising concentrating the juice.

10. A method for making juice entirely from the skin of acaí berries comprising the steps of:
   a. loading the berries into a insulated tanker of water within about 6 hours of the time the berries are picked, the water in the insulated tanker having:
      i. a temperature of from about 1 to about 5° C.; and
      ii. chlorine dioxide at a concentration of from about 1 to about 35 ppm; and
   b. holding the berries in the insulated tanker for up to about 48 hours;
   c. chilling the berries to below about 10° C. in water having a temperature of from about 1° C. to about 10° C. for from about 3 to about 10 minutes;
   d. preparing the berries for skin removal by rubbing and roughening the skin of the berries in an extractor with the addition of water resulting in a first mixture;
   e. acidifying the first mixture using lime juice;
   f. removing the skin from the berries in the first mixture in a finishing step to obtain a second mixture comprising skins, skin fragments, juice and water with the central portion of the berry, fiber and sand removed from the second mixture;
   g. heating the second mixture to from about 40° C. to about 60° C.;
   h. centrifuging the second mixture;
   i. de-aerating the second mixture;
   j. passing the second mixture through at least one of the group consisting of a high shear mixer, a colloid mill and a hammer mill to yield juice;
   k. homogenizing the juice; and
   l. pasteurizing the juice.

11. A method of removing the skins of acaí berries from the underlying nuts, sclerid cells, fiber, and lipid layers resulting in a final mixture of skin fragments, juice and water comprising the steps of:
   a. chilling the berries to below about 10° C.;
   b. abrading and loosening the skin of the chilled berries in an extractor with the addition of water resulting in a first mixture; and
   c. completing the removal of the skins from the berries in the first mixture by subjecting the first mixture to a finishing process to obtain the final mixture, with the central portion of the berry, fiber and sand removed from the final mixture.

12. The method of removing the skins of acaí berries of claim 11 wherein the finishing process comprises:
   placing the first mixture in a first finisher, the first finisher comprising a first screen with apertures ranging in size from 3 to about 5 mm in diameter, and a plurality of bars and brushes to move the berries against the screen resulting in a second mixture of skins, skin fragments, juice, sand and water;
   placing the second mixture in a second finisher, the second finisher comprising a second screen with apertures ranging in size from about 0.25 to about 1 mm in diameter, and a plurality of bars and brushes to slide the skins of the second mixture against the second screen to break down the skins to pass through the second screen and to separate the sand of the second mixture from the skin fragments, juice and water resulting in the final mixture.

\* \* \* \* \*